(12) United States Patent
    Watanabe

(10) Patent No.: US 7,164,911 B2
(45) Date of Patent: Jan. 16, 2007

(54) LOCATION REGISTRATION APPARATUS, LOCATION REGISTRATION METHOD, AND MOBILE COMMUNICATION NETWORK

(75) Inventor: Yugo Watanabe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 448 days.

(21) Appl. No.: 10/045,675

(22) Filed: Nov. 9, 2001

(65) Prior Publication Data

US 2002/0138195 A1 Sep. 26, 2002

(30) Foreign Application Priority Data

Nov. 10, 2000 (JP) .............................. 2000-344401

(51) Int. Cl.
    *H04Q 7/20* (2006.01)
(52) U.S. Cl. ............................... 455/435.1; 455/456.1; 701/19
(58) Field of Classification Search ............. 455/404.2, 455/414.2, 440, 456.1, 457, 435.1, 436, 433; 342/357.09, 457; 340/988, 539.13, 825.36; 701/19, 117, 212
    See application file for complete search history.

(56) References Cited

U.S. PATENT DOCUMENTS

| 5,384,824 | A | * | 1/1995 | Alvesalo ................... 455/456.2 |
| 5,539,810 | A | * | 7/1996 | Kennedy et al. ......... 379/88.25 |
| 5,937,350 | A | | 8/1999 | Frank |
| 5,970,408 | A | * | 10/1999 | Carlsson et al. ............ 455/439 |
| 6,272,344 | B1 | * | 8/2001 | Kojima ..................... 455/435.1 |
| 6,363,323 | B1 | * | 3/2002 | Jones ......................... 701/213 |
| 6,591,096 | B1 | * | 7/2003 | Ezuriko ...................... 455/411 |
| 6,646,569 | B1 | * | 11/2003 | Hamada .................. 340/995.1 |

FOREIGN PATENT DOCUMENTS

| JP | H06-244780 A | 9/1994 |
| JP | H08-070483 | 12/1996 |
| JP | H09-327057 A | 12/1997 |
| JP | 11-46380 | 2/1999 |
| WO | WO 98/35511 | 8/1998 |
| WO | WO99/56476 A1 | 11/1999 |

OTHER PUBLICATIONS

Office Action for Japanese Patent Application No. (JP)Tokugan2000-344401 (with translation) date unknown.
Irvine, J.; Couvy, J.; Graziosi, F.; Laurila, J.; Mossakowski, G.; Robin, P., "System Architecture For The Mostrain Project (Mobile Services For High Speed Trains)", *IEEE*, 1997, pp. 1917-1921 date unknown.

* cited by examiner

*Primary Examiner*—Charles Appiah
*Assistant Examiner*—Nghi H. Ly
(74) *Attorney, Agent, or Firm*—Brinks Hofer Gilson & Lione

(57) ABSTRACT

The presence area information of the moving portable communication terminals accompanied by a moving object is changed according to the scheduled path of the moving object and the scheduled time in the movement of the moving object by using a presence area unit which stores the presence area information indicating the presence area of each portable communication terminal and a moving schedule storage unit which stores the scheduled path information indicating the scheduled path of the moving object (a train, etc.) accompanied by at least one portable communication terminal and the scheduled time information indicating the scheduled time of the movement of the moving object.

8 Claims, 10 Drawing Sheets

FIG. 5A

BASE STATION TABLE OF BASE STATION 13A

| ID NUMBER | SCHEDULED PASS AREA | SCHEDULED PASS TIME |
|---|---|---|
| TID-01 | BASE STATION AREAS 4b & 4c | ... ~12:00:00 |
| | BASE STATION AREA 4c | 12:00:00~12:04:30 |
| | BASE STATION AREAS 4c & 4d | 12:04:30~12:05:30 |
| ... | ... | ... |

FIG. 5B

BASE STATION TABLE OF BASE STATION 13B

| ID NUMBER | SCHEDULED PASS AREA | SCHEDULED PASS TIME |
|---|---|---|
| TID-01 | BASE STATION AREAS 4c & 4d | 12:04:30~12:05:30 |
| | BASE STATION AREA 4d | 12:05:30~12:10:00 |
| | BASE STATION AREAS 4d & 4e | 12:10:00~ |
| ... | ... | ... |

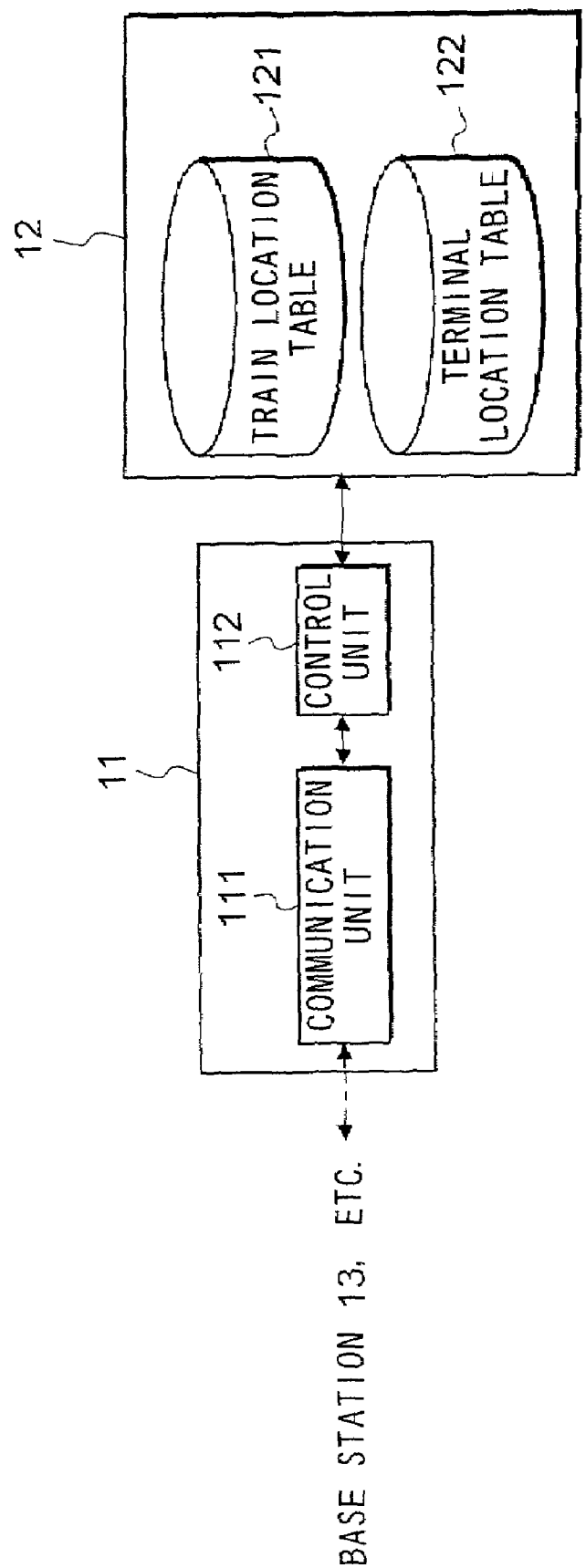

FIG. 7

TRAIN LOCATION TABLE

| ID NUMBER | SCHEDULED PASS AREA | SCHEDULED PASS TIME | AUXILIARY PASS AREA |
|---|---|---|---|
| TID-01 | ... | ... | ... |
| | BASE STATION AREA 4c | 12:00:00~12:04:30 | GENERAL REGISTRATION AREA 5A |
| | BASE STATION AREAS 4c & 4d | 12:04:30~12:05:30 | GENERAL REGISTRATION AREAS 5A & 5B |
| | BASE STATION AREA 4d | 12:05:30~12:10:00 | GENERAL REGISTRATION AREA 5B |
| | ... | ... | ... |

FIG. 8

TERMINAL LOCATION TABLE

| TERMINAL ID NUMBER | TERMINAL PRESENCE AREA |
|---|---|
| MID-002 | GENERAL REGISTRATION AREA 5C |
| MID-003 | ⟨SCHEDULED PASS AREA OF TRAIN (TID-01)⟩ |
| MID-004 | ⟨SCHEDULED PASS AREA OF TRAIN (TID-01)⟩ |

| TERMINAL ID NUMBER | TERMINAL PRESENCE AREA |
|---|---|
| MID-002 | GENERAL REGISTRATION AREA 5C |
| MID-003 | BASE STATION AREA 4c |
| MID-004 | BASE STATION AREA 4c |

| TERMINAL ID NUMBER | TERMINAL PRESENCE AREA |
|---|---|
| MID-002 | GENERAL REGISTRATION AREA 5C |
| MID-003 | BASE STATION AREAS 4c & 4d |
| MID-004 | BASE STATION AREAS 4c & 4d |

| TERMINAL ID NUMBER | TERMINAL PRESENCE AREA |
|---|---|
| MID-002 | GENERAL REGISTRATION AREA 5C |
| MID-003 | BASE STATION AREA 4d |
| MID-004 | BASE STATION AREA 4d |

TERMINAL LOCATION TABLE (WHEN SCHEDULE IS DISRUPTED)

| TERMINAL ID NUMBER | TERMINAL PRESENCE AREA |
|---|---|
| MID-002 | GENERAL REGISTRATION AREA 5C |
| MID-003 | GENERAL REGISTRATION AREA 5A |
| MID-004 | GENERAL REGISTRATION AREA 5A |

LOCATION REGISTRATION APPARATUS, LOCATION REGISTRATION METHOD, AND MOBILE COMMUNICATION NETWORK

BACKGROUND OF THE INVENTION

1. Field of the Invention

The present invention relates to an apparatus and a method of registering the location of a portable communication terminal, and a mobile communication network.

2. Description of the Related Art

As is widely known, it is a general practice in the mobile communication service to store the location of each portable communication terminal in a storage unit (a so-called location register) so that an incoming call can be received wherever the portable communication terminal such as a cellular phone is located. More specifically, a mobile communication service area is divided into a plurality of registration areas, and every portable communication terminal is registered in the location register in association with a registration area. Registration of portable communication terminal is conducted periodically and also as a portable communication terminal moves as follows; when a portable communication terminal moves from one registration area to the other, a location registration request specifying the registration area after the movement is transmitted to the network. The registration area of the portable communication terminal stored in a storage unit is updated according to this location registration request.

However, when a train with a lot of passengers possessing portable communication terminals moves from one registration area to the other, lots of location registration requests are transmitted from their portable communication terminals, and a problem occurs in that network traffic increases temporarily and considerably.

To solve the above drawback, for example, Japanese Patent Application Publication No. 11-46380 discloses a mobile communication system in which location registration requests from a plurality of portable communication terminals in a train are represented by one location request by a communication unit installed in the train. In this mobile communication system, a plurality of portable communication terminals located in the train register their locations with the above communication unit as an imaginary base station and, when the train moves from one registration area to the other, the communication unit transmits a location registration request to a control station via a base station. In this way, and location registrations by a plurality of portable communication terminals in the train is represented by a communication unit.

However, in the mobile communication system disclosed in the above Japanese Unexamined Patent Application Publication, communication units in trains must transmit location registration requests to the control station. Hence, a circumstance is still left unchanged in an urban area with considerably many trains in that the control station must receive a large number of location registration requests. Therefore, there is a limit in sufficiently reducing network traffic between base stations and a control station even if the above mobile communication system is used.

SUMMARY OF THE INVENTION

The present invention is made in light of the above problem, and accordingly, an object of the present invention is to provide a location registration apparatus and a location registration method, and a mobile communication network in which the increase in the communication traffic attributable to the location registration on these portable communication terminals can be effectively suppressed even when a plurality of portable communication terminals move all together.

In order to solve the above problem, a location registration apparatus comprises a presence area storage unit for storing a presence area information indicating the presence area of each portable communication terminal, a traveling schedule storage unit for storing a scheduled path information indicating the scheduled path of a moving object accompanied by one or more portable communication terminals and a scheduled time information indicating the scheduled time of the movement of the moving object, and a control unit for changing the presence area information of a portable communication terminal accompanied by the moving object to a presence area information according to the location of the moving object based on the scheduled path information and the scheduled time information.

The present invention also provide a location registration apparatus comprising:

a presence area storage unit for storing a presence area information indicating a presence area of a portable communication terminal;

a traveling schedule storage unit for storing a scheduled path information indicating a scheduled path of a moving object and a scheduled time information indicating a scheduled time of the movement of the moving object; and a control unit for, while the portable communication terminal is moving with the moving object, changing the presence area information of the portable communication terminal stored in the presence area storage unit based on the current time, the scheduled path information, and the scheduled time information stored in the traveling schedule storage unit.

As described above, even when a plurality of portable communication terminals are moved all together, the increase in the communication traffic attributable to the location registration on the portable communication terminals can be effectively suppressed in the present invention.

BRIEF DESCRIPTION OF THE DRAWINGS

FIGS. 5A and 5B show the contents of base station tables in the mobile communication system.

FIG. 6 is a block diagram showing the configuration of a control station and a storage unit in the mobile communication system.

FIG. 7 shows the contents of a train location table in the mobile communication system.

FIG. 8 shows the contents of a terminal location table in the mobile communication system.

FIGS. 9A to 9C illustrate the terminal location areas in the mobile communication system changing with time.

DESCRIPTION OF THE PREFERRED EMBODIMENTS

The embodiments of the present invention will be described with reference to the attached drawings. The embodiments show examples of the present invention, and are not limited thereto, and can be arbitrarily modified in a scope of the present invention.

A: Configuration of Embodiment

Figure 1:
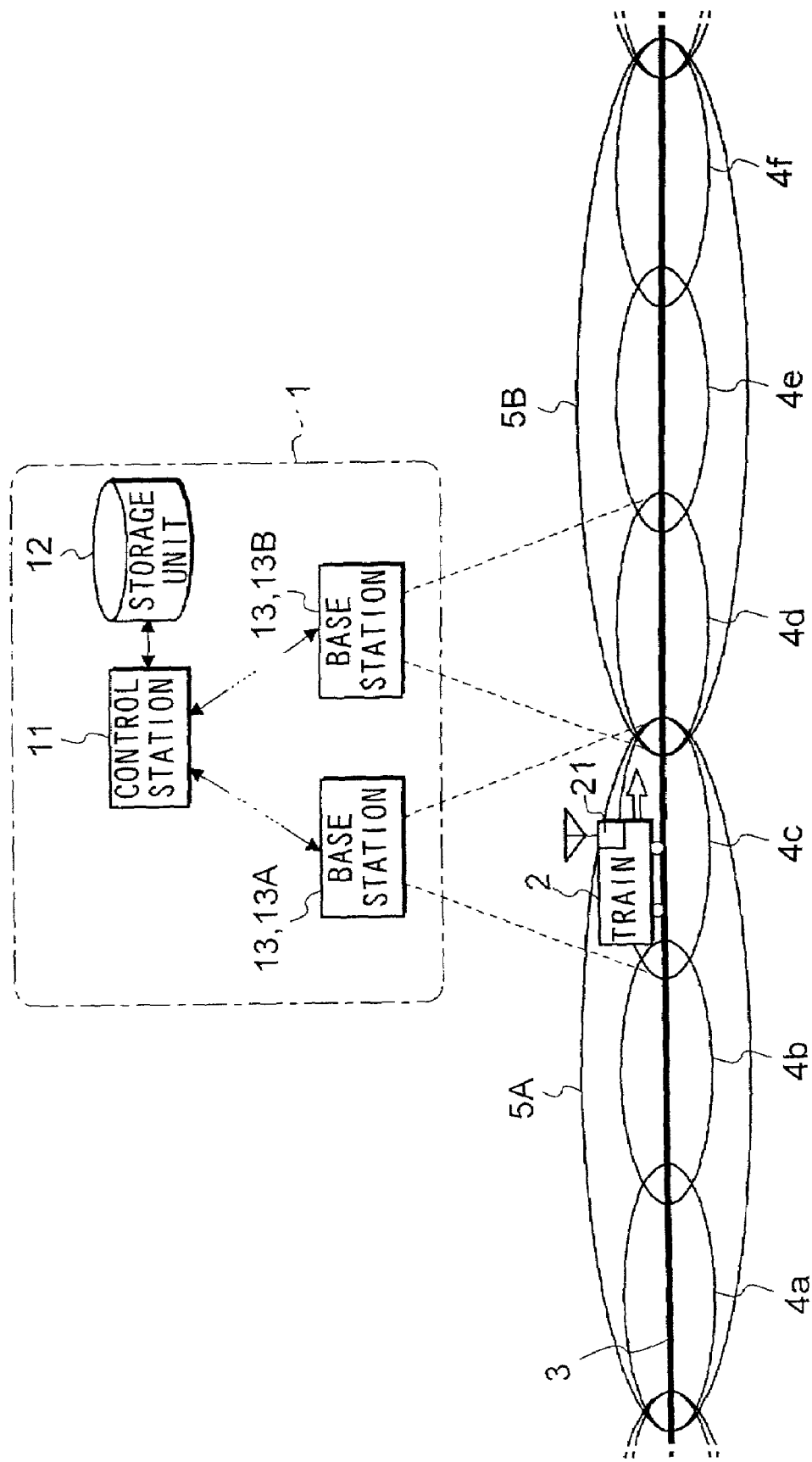
FIG. 1 is a block diagram showing the overall configuration of a mobile communication system according to an embodiment of the present invention.

FIG. 1 shows the overall configuration of a mobile communication system according to the embodiment of the present invention. As shown in the figure, the mobile communication system comprises a mobile communication network 1 including a control station 11, a storage unit 12 and a plurality of base stations 13 and a relay unit 21 (moving object communication unit) installed in a train 2. In FIG. 1, only two base stations 13A and 13B are shown in order to prevent the figure from being too complicated, but in an actual configuration, there are more base stations 13. Similarly, only one train 2 is shown in FIG. 1, but actually, more trains 2 are present, and the relay unit 21 is installed in each of them.

As shown in the figure, each base station 13 is disposed with some distance from each other, and each base station forms a base station area 4 (denoted by numerals "4a" to "4f" in FIG. 1, respectively). Each base station area 4 indicates an area in which the radio communication with the base stations 13 forming the base station area is possible. In the explanation below, as shown in FIG. 1, it is assumed that the base station 13A forms the base station area 4c, and the base station 13B forms the base station area 4d. In addition, each base station area 4 has an overlapping portion on each other.

Figure 2:
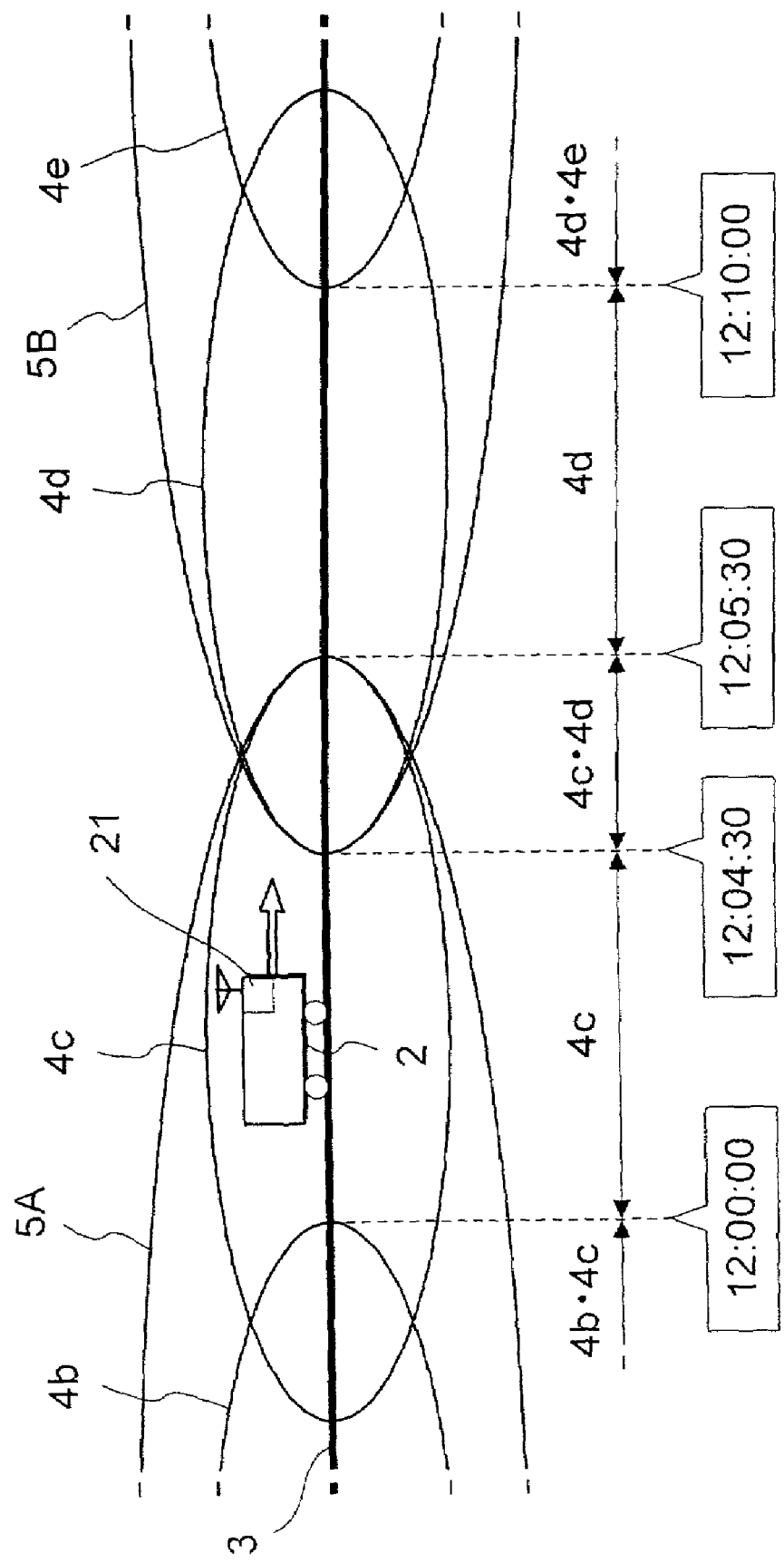
FIG. 2 shows an example of a running schedule of a train in the mobile communication system.

The train 2 is a moving object which moves on a track 3 based on a predetermined running schedule (a schedule), and a plurality of passengers having a portable communication terminal such as a cellular phone are on the train. The train 2 successively passes a plurality of base station areas 4 which the track 3 crosses at the time according to the schedule of the train 2. It is assumed below that the train 2 with the ID number "TID-01" allotted thereto is scheduled to pass through each base station area 4 at each time shown in FIG. 2. This means that the train 2 is present (only) in the base station area 4c between the time "12:00:00 (means 12 o'clock, 00 minute(s), and 00 second(s), same as below)" to the time "12:04:30", the train is present in the overlapping portion between the base station area 4c and the base station area 4d between the time "12:04:30" and the time "12:05:30", and present (only) in the base station area 4d between the time "12:05:30" and the time "12:10:00".

Figure 3:
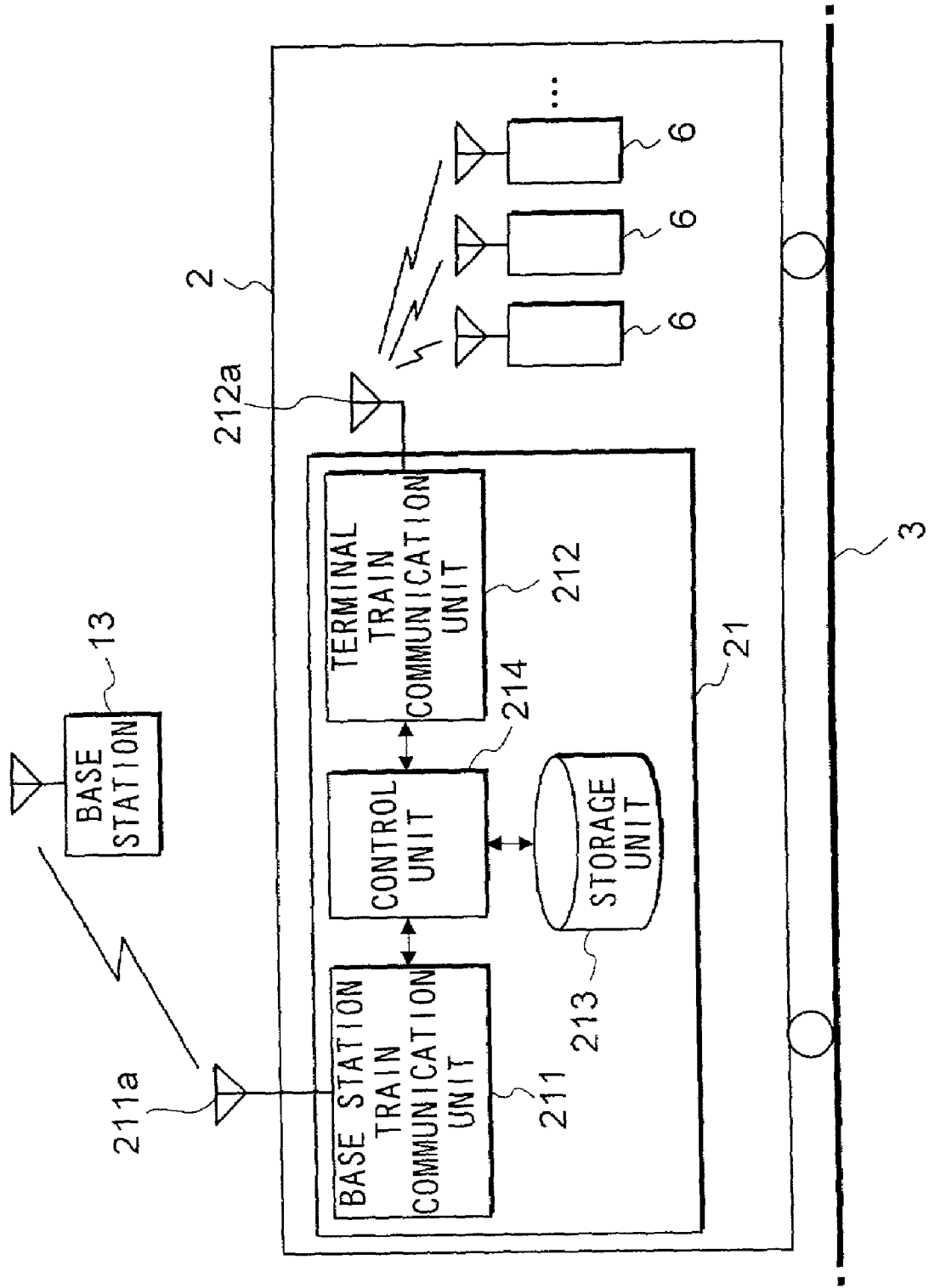
FIG. 3 is a block diagram showing the configuration of the train in the mobile communication system.

Next, FIG. 3 is a block diagram of the train 2 showing the configuration of a portion related to the mobile communication system according to the present embodiment. As shown in the figure, the relay unit 21 installed in the train 2 comprises a base-station-train communication unit 211, a terminal-train communication unit 212, a storage unit 213 and a control unit 214.

The base-station-train communication unit 211 comprises an antenna 211a located outside the train 2, and implements the radio communication to and from the base station 13. That is, the base-station-train communication unit 211 receives signal from the base station 13 via the antenna 211a and outputs it to the control unit 214, and also receives signal from the control unit 214 to transmit to the base station 13 via the antenna 211a. The terminal-train communication unit 212 comprises an antenna 212a located inside the train 2, and implements the radio communication to and from a portable communication terminal 6 accommodated in the train 2. That is, the terminal-train communication unit 212 receives signal from the portable communication terminal 6 via the antenna 212a and outputs it to the control unit 214, and also receives signal from the control unit 214 to transmit to the portable communication terminal 6 via the antenna 212a.

The storage unit 213 stores the identification number allotted to the train 2 with the relay unit 21, the information to specify the base station area 4 in which the train 2 is currently located (hereinafter, referred to as the "information on the base station"), etc. in addition to various programs executed by the control unit 214. The control unit 214 functions as a control center of the relay unit 21 by receiving/transmitting various kinds of information from/to each unit in the relay unit 21.

Figure 4:
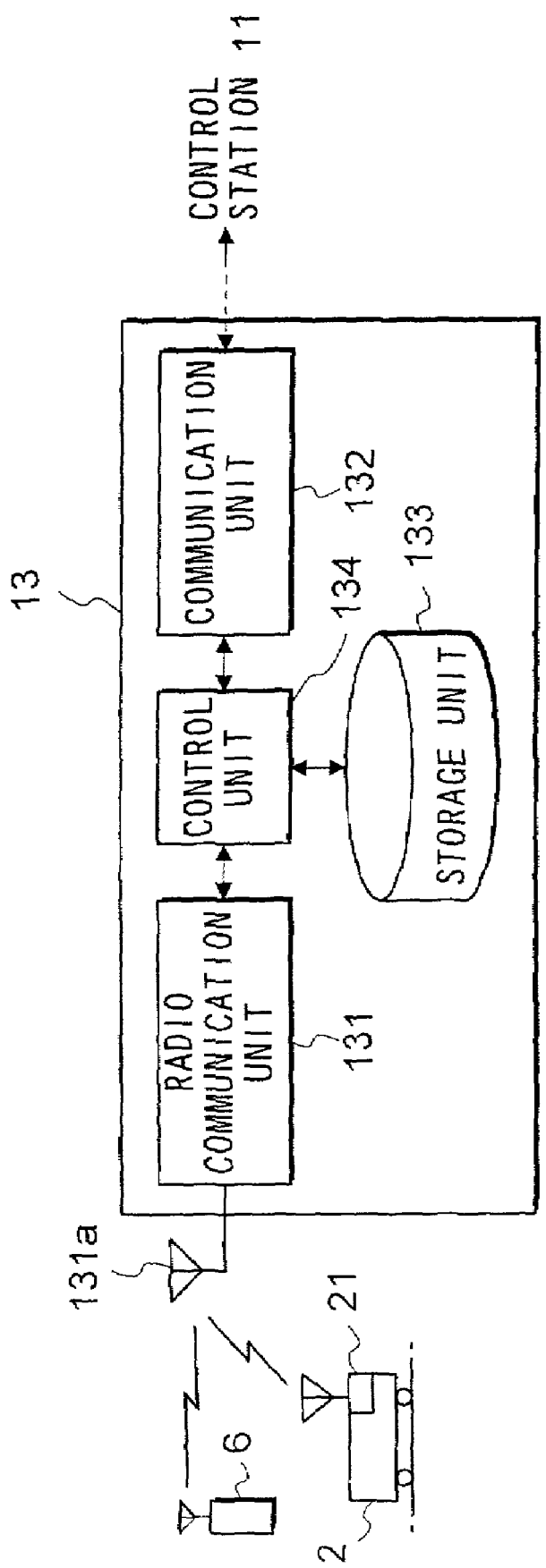
FIG. 4 is a block diagram showing the configuration of a base station in the mobile communication system.

FIG. 4 is a block diagram showing the configuration of base station 13 in the mobile communication network 1. As shown in the figure, the base station 13 comprises a radio communication unit 131, a communication unit 132, a storage unit 133, and a control unit 134. The radio communication unit 131 has an antenna 131a and implements the radio communication with the portable communication terminal 6 located outside the train s and the relay unit 21. The radio communication unit 131 transmits the information on the base station to specify the base station 13 to the relay unit 21 or the portable communication terminal 6 located in the base station area 4 of the base station 13 under the control by the control unit 134. On the other hand, the communication unit 132 implements communication via a switching center (not shown in the figure), etc. with the control station 11. The control unit 134 receives/transmits the information from/to each unit in the base station 13, and functions as the control center of the base station 13.

The storage unit 133 stores a base station table in addition to various kinds of programs executed by the control unit 134. The base station table is a table that tells when the train 2 is located in the base station area 4 of the base station 13, and is used to determine whether or not train 2 moves on schedule (the specific contents will be described later).

FIG. 5A shows a base station table stored in the storage unit 133 of a base station 13A, and FIG. 5B shows a base station table stored in the storage unit 133 of a base station 13B. As shown in FIGS. 5A and 5B, the identification number of train 2 is linked to the scheduled time (hereinafter, referred to as the "scheduled pass time"), the time in which train 2 is located in the base station area 4 of the base station 13 that keeps the base station table.

As shown in FIG. 5A, the train 2 with the identification number "TID-01" is scheduled to be present in the base station area 4c of the base station 13A in a time zone from the time "12:00:00" to the time "12:04:30". The present embodiment assumes a case such that a plurality of adjacent base station areas 4 have an overlapping portion on each other (refer to FIG. 1). As a result, the base station table includes the scheduled time in which the train 2 is present in both the base station area 4 of the base station 13 and the base station area 4 adjacent thereto (this means that the train is present in the overlapping portion of the base station areas 4) in addition to the time in which the train 2 is present only in the base station area of one base station 13. For example, the base station table of the base station 13A shown in FIG. 5A indicates that the train 2 of the identification number "TID-01" is scheduled to be present in the overlapping portion of the base station area 4c of the base station 13A and the base station area 4d of the base station 13B between the time "12:04:30" to the time "12:05:30". This is the same for the base station table of the base station 13B shown in FIG. 5B.

Next, with reference to FIG. 6, the configuration of the control station 11 and the storage unit 12 will be described. The storage unit 12 is a database to register the location (more strictly, an area) of the portable communication terminal 6 that receives the mobile communication service using the mobile communication network 1. The storage unit 12 comprises the storage unit 121 storing the train location table and the storage unit 122 storing the terminal location table as shown in FIG. 6. The contents of these tables will be described below.

As shown in FIG. 7, identification number of train 2, the scheduled pass area information indicating the scheduled base station area 4 in which the train 2 is present, and the scheduled pass time information indicating the scheduled time in which the train 2 is present in each base station area 4 are linked to each other in the train location table. For example, as shown in FIG. 7, when the "base station area 4c", and "12:00:00 to 12:04:30" are stored for the scheduled pass area information and the scheduled pass time information of the train 2 with the identification number "TID-01", the table indicates that the train 2 with the identification number "TID-01" is scheduled to be present in the "base station area 4c" between the time "12:00:00" and the time "12:04:30". This train location table is also prepared based on the running schedule of the train 2 shown in FIG. 2 similar to the base station table. As a result, the scheduled pass area of the train 2 with the same identification number is matched with the scheduled pass time thereof in both the train location table and the base station table.

FIG. 8 shows the specific contents of the terminal location table. As shown in the figure, the terminal identification number of each portable communication terminal 6 (both the portable communication terminal 6 in the train 2 and the portable communication terminal 6 outside the train 2) is linked to the information on the terminal presence area indicating the area in which each portable communication terminal 6 is present (hereinafter, referred to as the "terminal presence area") in the terminal location table. As described below, when the control station 11 receives the incoming call request to be transmitted to portable communication terminal 6, the incoming call request is transmitted to the base station 13 in the terminal presence area registered for the portable communication terminal 6. This means that the terminal presence area indicates a range for transmitting the incoming call request.

In the present embodiment, the terminal presence area registered for the portable communication terminal 6 in the train 2 is, in principle, different from the terminal presence area registered for the portable communication terminal 6 outside the train 2. More in detail, for the portable communication terminal 6 outside the train 2, a general registration area 5 (refer to FIG. 1) including a plurality of base station areas 4 is registered as the terminal presence area. On the other hand, for the portable communication terminal 6 in the train 2, the scheduled pass area of the train 2, i.e., the base station area 4 in which the passing of the train 2 is scheduled to be, is registered as the terminal presence area.

For example, in FIG. 8, the portable communication terminal 6 with the terminal identification number "MID-002" is located outside the train 2, and the "general registration area 5C" (not shown in FIG. 1) is registered as the terminal presence area. This means that the information specifying the general registration area 5C is stored as the information on the terminal presence area. On the other hand, the portable communication terminal 6 with the terminal identification number "MID-003" or "MID-004" is located in the train 2 with the identification number "TID-01", and thus, the "scheduled pass area of the train 2" is registered as the terminal presence area. As described above, the scheduled pass area is the base station area 4 in which the presence of the train 2 is scheduled to be based on the scheduled pass time and the scheduled pass area, and transfers to different base station areas 4 successively as time elapses. Thus, when the "scheduled pass area of the train 2" is registered as the terminal presence area of the portable communication terminal 6 in the train 2, the terminal presence area is changed as necessary to each base station area 4 in which the train 2 is scheduled to pass as time elapses.

However, in practice, the train 2 does not always run on time, and for example, a delay in the running time can occur due to an accident resulting in injury or death, failures of various kinds of equipment, etc. When the schedule is thus disrupted, it is assumed that train 2 is not in the scheduled pass area at the scheduled pass time. In order to cope with such a circumstance, the train location table according to the present embodiment includes an auxiliary pass area information in addition to the scheduled pass area information as shown in FIG. 7. The auxiliary pass area information indicates the general registration area 5 through which the train 2 passes as it moves. When the schedule is disrupted, the general registration area 5 indicated by the auxiliary pass area information is registered as the terminal presence area in a similar manner to the portable communication terminal 6 located outside the train 2.

Again in FIG. 6, the control station 11 is a computer system to implement the location registration and other processing for the portable communication terminal 6, and comprises a communication unit 111 and a control unit 112. The communication unit 111 receives the information transmitted from each base station 13 and outputs it to the control unit 112, and transmits the information supplied from the control unit 112 to each base station 13. The control unit 112 implements the write of the information in the storage unit 12 and the read-out of the information from the storage unit 12 according to the information received via the communication unit 111. In addition, when the control unit 112 receives the incoming call request to portable communication terminal 6 via the communication unit 111, it refers to the terminal location table in the storage unit 12, and specifies the presence area of the portable communication terminal 6, and transmits the incoming call request to the base station 13 located in the specified presence area.

B: Operation of the Embodiment

Next, the operation of the present embodiment will be described. It is assumed here that the train 2 runs punctually following the predetermined schedule, and the operation when the schedule is disrupted for some reason will be described later.

First, explanation is given for a case when the portable communication terminal 6 is moved from a platform of a station into the train. On the platform, the portable communication terminal 6 receives an advertisement message from a base station 13 that forms an area covering the station. When the portable communication terminal 6 is moved into the train 2, the portable communication terminal 6 receives an advertisement message transmitted by the relay unit 21 of the train 2. When the receiving level of this advertisement message is stronger than that of the base station 13 or stronger than a threshold determined in advance, the portable communication terminal 6 detects that it went into the train 2. Then, it transmits a request for the terminal location registration including the terminal identification number of the portable communication terminal 6 to the relay unit 21.

When the control unit 214 in the relay unit 21 receives the request for the terminal location registration transmitted via the terminal-train communication unit 212, it extracts the terminal identification number from the request for the terminal location registration, and generates a request for the location registration including the extracted terminal identification number and the identification number of the train 2 stored in the storage unit 213. In addition, the control unit 214 transmits this location registration request to the base station 13 forming the base station area 4 in which the relay unit 21 is present via the base-station-train communication unit 211.

The radio communication unit 131 in the base station 13 receives from the relay unit 134 the location registration request and outputs it to the control unit 134. Then, the control unit 134 transmits the location registration request to the control station 11 via the communication unit 132. The communication unit 111 in the control station 11 receives the location registration request and outputs it to the control unit 112. The control unit 112 retrieves the terminal identification number of the portable communication terminal 6 included therein from the terminal location table stored in the storage unit 122 of the storage unit 12. In addition, the control unit 112 determines whether or not the identification number of the train 2 is included in the location registration request. It is assumed here that the received location registration request is transmitted from the portable communication terminal 6 accommodated in the train 2, and therefore includes the identification number of the train 2. In this case, the control unit 112 registers the scheduled pass area of the train 2 specified by the identification number of the portable communication terminal 6 as the terminal presence area for the previously retrieved portable communication terminal 6.

More specifically, the control unit 112 specifies the base station area 4 in which the train 2 is scheduled to be at the current time based on the scheduled pass area and the scheduled pass time in the train location table. The identified base station area 4 is registered as the terminal presence area of the portable communication terminal 6 moving with the train 2. For example, it is assumed that two portable communication terminals 6 with the terminal identification numbers "MID-003" and "MID-004" are moving with the train 2 with the identification number "TID-01", and as a result, the control unit 112 in the control station 11 receives the location registration request on these portable communication terminals 6 at the time "12:00:00". Among the train location tables shown in FIG. 7, according to the scheduled pass time information and the scheduled pass area information corresponding to the identification number "TID-01", the base station area 4 in which the train is scheduled to be at the time "12:00:00" is the "base station area 4c". Thus, as shown in FIG. 9A, the control unit 112 registers the "base station area 4c" as the terminal presence area of the portable communication terminals 6 with the terminal identification number "MID-003" and "MID-004".

In addition, the control unit 112 in the control station 11 changes the terminal presence area of the portable communication terminal 6 in the train 2 as necessary (for example, at a predetermined time interval) so that the terminal presence area of the portable communication terminal 6 in the train 2 becomes the base station area 4 in which the train 2 is scheduled to be based on the information on scheduled pass time and the scheduled pass area information in the train location table. The procedure will be described below in more detail.

In the above example, for the portable communication terminal 6 with the terminal identification number "MID-003" and "MID-004", the "base station area 4c" is registered as the terminal presence area. According to the train location table in FIG. 7, the time at which the train 2 with the identification number "TID-01" with these portable communication terminals 6 accommodated therein is scheduled to be in the base station area 4c is until the time "12:04:30". As a result, the contents of the terminal location table are maintained as the contents shown in FIG. 9A to the time "12:04:30". On the other hand, as shown in FIG. 7, at the scheduled pass time "12:04:30 to 12:05:30", the base station area 4 at which the train 2 is scheduled to be is "the base station areas 4c and 4d". Thus, at the time "12:04:30", as shown in FIG. 9B, the control unit 112 changes the terminal presence areas of the portable communication terminals 6 with the terminal identification numbers "MID-003" and "MID-004" to "the base station areas 4c and 4d". Similarly, as shown in FIG. 9C, at the time "12:05:30", the control unit 112 changes the terminal presence areas of these portable communication terminals 6 to "the base station area 4d", and the terminal presence area is maintained till the time "12:10:00".

As described above, in the present embodiment, the terminal presence area of the portable communication terminal 6 in the train 2 is changed as necessary by the control unit 112 in the control station 11. Therefore, even when a large number of portable communication terminals 6 in the train 2 are moved all together, the location registration of these portable communication terminals can be implemented only by the control station 11 so long as the train 2 moves by following the predetermined schedule.

When the portable communication terminals 6 in the train 2 are moved outside the train 2 as passengers get on/get off the train, the following operations will be implemented. It is assumed here that a plurality of portable communication terminals 6 are moved outside the train 2 all together.

Firstly, when the portable communication terminal 6 is moved outside the train 2, receiving level of the advertisement message sent from the relay unit 21 decreases. When the receiving level becomes lower than a threshold determined in advance, the portable communication terminal 6 searches other advertisement message. When the portable communication terminal 6 receives an advertisement message from a base station 13, and its receiving level is higher than a threshold determined in advance, the portable communication terminal 6 detects that it is moved outside the train 2. Then, it transmits a request for deleting the location registration including the terminal identification number of the portable communication terminal 6 to the relay unit 21. When the control unit 214 in the relay unit 21 receives the request for deleting the location registration from the portable communication terminal 6, it transmits a request for deleting the location registration including the terminal identification number of the portable communication terminal 6 extracted from the request for deleting the location registration to the control station 11 via the base-station-train communication unit 211. When the control unit 112 in the control station 11 receives the request for deleting the location registration via the communication unit 111, it extracts the terminal identification number of the portable communication terminal 6 included therein. The control unit 112 retrieves the extracted terminal identification number of the portable communication terminal 6 from the terminal location table, and changes the base station area 4 registered at this time as the terminal presence area of the retrieved terminal identification number (the scheduled pass area of the train 2 at this time) to the general registration area 5 including the base station area 4. As a result, the relationship between the terminal presence area and the scheduled pass area of the train 2 is deleted, and the general registration area 5 in which a portable communication terminal 6 is located will be registered as the terminal presence area thereafter.

In this explanation, a request for deleting the location registration is sent from the portable communication terminal to the control station via the relay unit 21 and the base station 13. However, without using the relay unit 21, it may be sent from the portable communication terminal 6 to the control station 11 via the base station 11.

The operations when the train 2 moves on the predetermined schedule are described above. However, in practice, the schedule of the train can be disrupted. If the scheduled base station area 4 in which the train 2 is present is specified by using the train location table prepared on the assumption that the schedule is normal though the schedule is actually disrupted, and this base station area is registered as the terminal presence area of the portable communication terminal 6, the terminal presence area of the portable communication terminal 6 which does not actually move on schedule can be changed as if the train did move on schedule. Therefore, in the present embodiment, each base station 13 determines whether or not the schedule of the train 2 is disrupted. When the base station 13 determines that the schedule is not disrupted, the control station 11 continues the operations in a similar manner to the above. On the other hand, if it is determined that the schedule is disrupted, the scheduled pass area stored in the terminal location table as the terminal presence area is changed to the auxiliary presence area included in the train location table. These operations will be described below in more detail.

Figure 10:
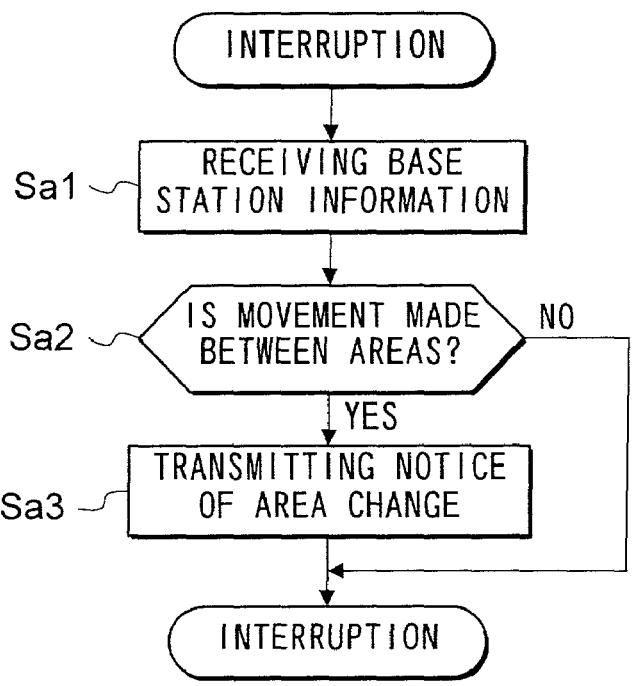
FIG. 10 is a flowchart showing the contents of the interruption executed by a relay unit in the mobile communication system.

Firstly, the control unit 214 in the relay unit 21 executes the interruption shown in FIG. 10 at a predetermined time interval. In the interruption, the control unit 214 receives the radio waves from the base station 13 via the base-station-train communication unit 211 (STEP Sa1). Then, the control unit 214 compares the information on the base station obtained from the radio waves indicating the highest reception level out of the received radio waves with the information on the base stations stored in the storage unit 213, and determines whether or not the relay unit 21 is moved from one base station area 4 to the other base station area 4 (STEP Sa2). This means, if the information on the base station obtained in STEP Sa1 is the same as the information on the base station stored in the storage unit 213, it is determined that the relay unit 21 does not move across the base station areas 4. On the other hand, if the obtained information on the base station is different from the information on the base station stored in the storage unit 213, it is determined that the relay unit 21 is moving over base station areas 4.

As a result of this determination, if it is determined that the relay unit 21 does not move over the base station areas 4, the control unit 214 completes the interruption without any other processing. On the other hand, if it is determined that the relay unit 21 moves over the base station areas 4, the control unit 214 transmits the area change notice including the identification number of the train 2 with the relay unit 21 installed therein to the base station 13 forming the base station area 4 after the movement (STEP Sa3), and then, the interruption is completed.

Figure 11:
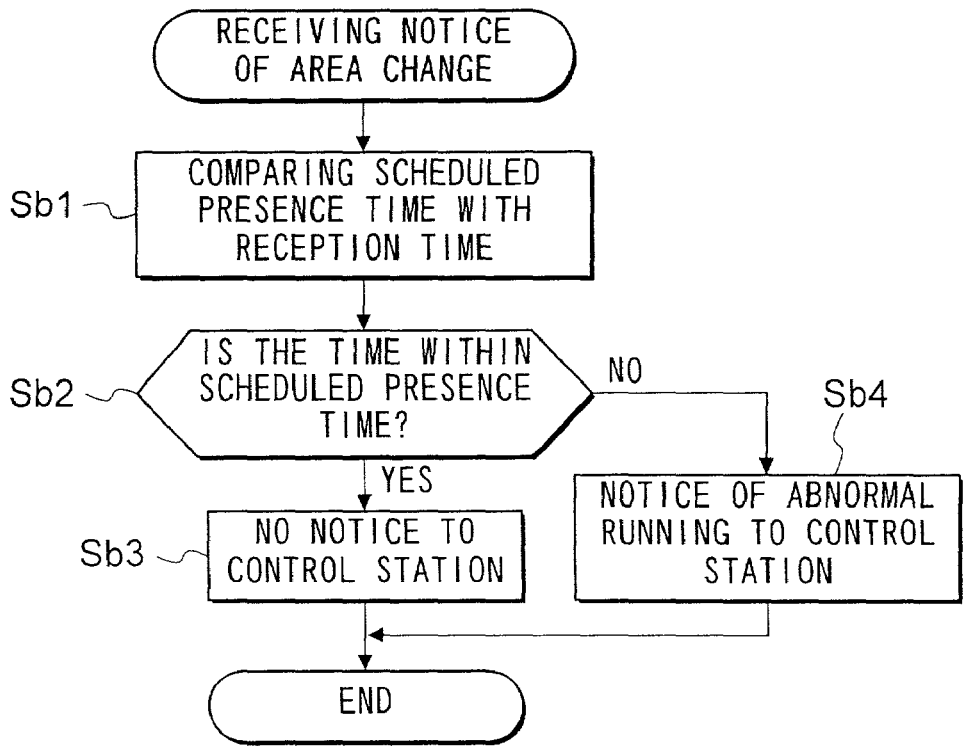
FIG. 11 is a flowchart showing the detailed operation when the base station receives a notice on the area change in the mobile communication system.

On the other hand, when the control unit 134 in each base station 13 receives the area change notice from the relay unit 21, it executes the processing shown in FIG. 11. This means that the control unit 134 firstly extracts the identification number of the train 2 included in the area change notice, and retrieves the scheduled pass time for the identification number from the base station table. In addition, the control unit 134 compares the retrieved scheduled pass time with the time at which the area change notice is received (STEP Sb1), and determines whether or not the time of reception is within the scheduled pass time (STEP Sb2). As a result of this determination, if it is determined that the time of reception is within the scheduled pass time, the train 2 is determined to be in the base station area 4 of the base station 13 substantially on schedule, and the control unit 134 completes the processing without making any notice to the control station 11 (STEP Sb3). In this case, the control station 11 continues the processing of successively updating the terminal presence area in the terminal location table according to the scheduled pass area in the train location table.

On the other hand, if it is determined that the time of reception is earlier than the scheduled pass time as a result of the determination in STEP Sb2, it is expected that the train 2 moves in the base station area 4 of the base station 13 earlier than scheduled. The control unit 134 transmits a notice of abnormal running indicating that the schedule is disrupted to the control station 11 (STEP Sb4), and then, completes the processing. Taking the base station table of the base station 13A shown in FIG. 5A as an example, if the area change notice is transmitted from the relay unit 21 with the identification number "TID-01" and the base station 13A received the notice before the time "12:00:00", it is determined that the train 2 runs earlier than scheduled, and the control unit 134 transmits the notice of abnormal running indicating that the train does not run on schedule to the control station 11. In this example, only the case that the time of reception of the area change notice is earlier than the scheduled pass time is described. However, if the time of reception is later than the scheduled pass time, it will be coped with by the processing shown below.

Figures 12, 13:
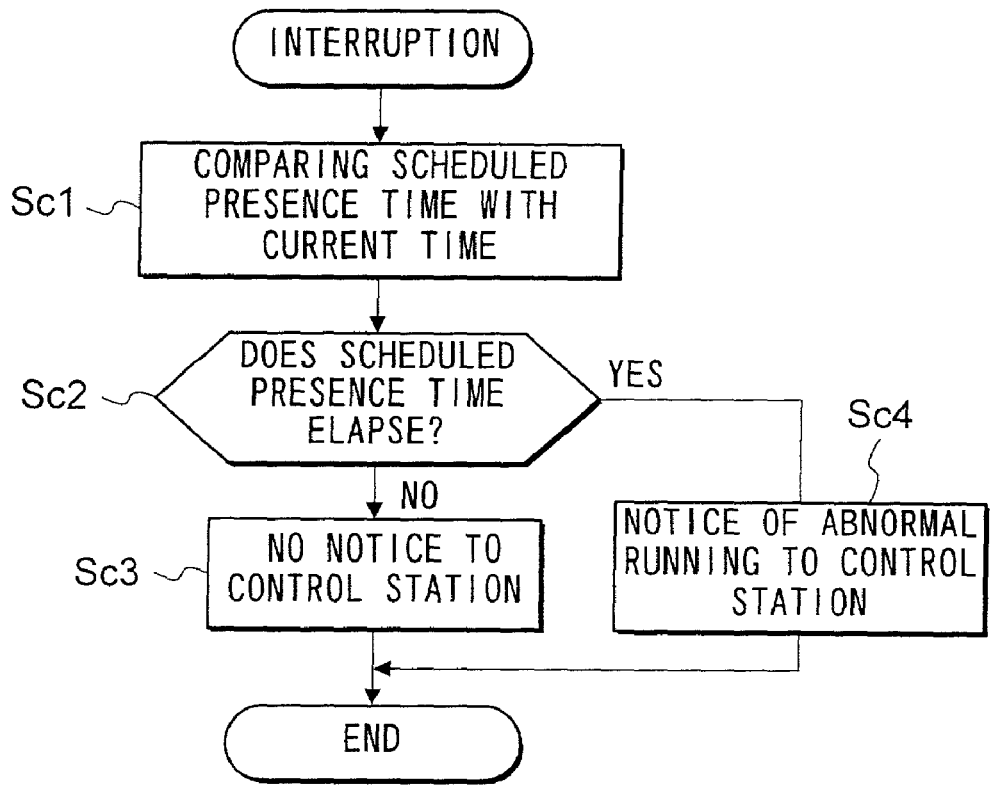
FIG. 12 is a flowchart showing the contents of the interruption executed by the base station in the mobile communication system.
FIG. 13 shows the contents of the terminal location table when the schedule is disrupted in the mobile communication system.

FIG. 12 is a flowchart showing the contents of the interruption executed at a predetermined time interval by the control unit 134 of the base station 13. As shown in the figure, when the interruption is started, the control unit 134 refers to the base station table, and as for the train 2 with the relay unit 21 which has not yet transmitted an area change notice to the base station 13, the control unit 134 sees the scheduled pass time at which the train 2 should be in the base station area 4 of the base station 13. The control unit 134 compares the extracted scheduled pass time with the current time (STEP Sc1) and determines whether or not the scheduled pass time has already elapsed (STEP Sc2). As a result, if it is determined that the scheduled pass time has not yet elapsed, it can be determined that the schedule is not considerably disrupted, and the control unit 134 completes the processing without making any notice to the control station 11 (STEP Sc3). That is, taking the base station table of the base station 13A shown in FIG. 5A for an example, if the interruption is executed at, for example, the time "12:05:00", and even if the train 2 with the identification number "TID-01" has not yet transmitted any area change notice to the base station 13, the train 2 possibly moves in the base station area 4d of the base station 13A by the subsequent time "12:05:30", and it is thus determined that the schedule is not considerably disrupted. While no notice of the abnormal running is transmitted from the base station 13, the control station 11 continues the processing of successively updating the terminal presence area in the terminal location table following the train location table.

On the other hand, in STEP Sc2, when it is determined that the scheduled pass time has already elapsed, that is, if no area change notice is transmitted from the relay unit 21 of the train 2 even when the scheduled pass time has elapsed at which the train 2 was scheduled to pass the base station area 4 of the base station 13, the control unit 134 determines that the schedule of the train 2 is seriously disrupted, and transmits the notice of abnormal running including the identification number of the train 2 to the control station 11 (STEP Sc4). Then, the control unit 134 completes the interruption. That is, taking the base station table of the base station 13A shown in FIG. 5A as an example, the control unit 134 of the base station 13A transmits the notice of abnormal running to the control station 11 if no area change notice is received from the relay unit 21 installed in the train 2 with the identification number "TID-01" though the time "12:05:30" scheduled as the time at which the train should be present in the base station area 4c elapses.

As described above, if it is determined that the schedule is disrupted for train 2, a notice of abnormal running including an identification number of the train 2 is transmitted from the base station 13 to the control station 11. The operations of the control station 11 which received the notice of abnormal running will be described below.

When the control unit 112 in the control station 11 receives the notice of abnormal running via the communication unit 111, it extracts the identification number of the train 2 included therein. Then the control unit 112 searches the extracted identification number in the train location table, and reads out the information on the auxiliary presence area for the current time. In addition, the control unit 112 retrieves the terminal identification number of the portable communication terminal 6 which uses the scheduled pass area of the train 2 having this identification number as the terminal presence area from the terminal location table. The control unit 112 changes the terminal presence area for the terminal identification number of the retrieved portable communication terminal 6 to the general registration area 5 indicated by the information on the auxiliary presence area which is previously read out from the train location table. Taking FIGS. 7 and 8 as an example, when the notice of abnormal running including the identification number "TID-01" is received at the time "12:03:00", the control unit 112 reads out the "general registration area 5A" corresponding to the scheduled pass time "12:00:00 to 12:04:30". The control unit 112 changes the terminal presence area of the portable communication terminals 6 with the terminal identification number "MID-003" and "MID-004" which use the scheduled pass area of the train 2 with the identification number "TID-01" as the terminal presence area to the "general registration area 5A". FIG. 13 illustrates the contents of the thus changed terminal location table. As described above, in the present embodiment, the general registration area 5 having a more extensive range than the base station area 4 is used as the terminal presence area of the portable communication terminal 6 accommodated in the train 2 in which the schedule thereof is disrupted, and thus, the abnormality of the schedule can be coped with.

As described above, in the present embodiment, the terminal presence areas of the plurality of portable communication terminals 6 accommodated in the train 2 are changed as necessary in the control station 11 according to the scheduled pass area and the scheduled pass time of the train location table which is prepared in advance based on the schedule of the train 2. As a result, so long as the train runs on schedule, the request for the terminal location registration from the portable communication terminals accommodated in the train 2 or the area change notice transmitted from the relay unit 21 need not be transmitted or received between each base station 13 and the control station 11. Thus, according to the present embodiment, the increase of the communication traffic for the location registration for these portable communication terminals can be effectively suppressed even when a plurality of portable communication terminals are moved all together.

On the other hand, in the present embodiment, the base station area 4 and the general registration area 5 can be switched as necessary for the terminal presence area of each portable communication terminal, and thus, the present embodiment can cope with not only the case in which the train 2 punctually runs on the predetermined schedule, but also the case in which the schedule is disrupted.

In the conventional mobile communication services, when the incoming call request is sent to a portable communication terminal, the incoming call request is sent to an area including a plurality of base station areas. In other words, when the incoming call request is sent to a portable communication terminal, the incoming call request is sent by using a plurality of base stations. One reason for the above, it is difficult to specify only one base station area with the portable communication terminal, as the movement of the portable communication terminal cannot be predicted by the network side. If such a method is employed, for example, an incoming call request is sent not only to the base station where the target portable communication terminal is located but also to other neighboring base stations. Considering such a circumstance, the incoming call request procedure has not been necessarily and efficiently implemented in the conventional mobile communication system.

On the other hand, the location of the portable communication terminal 6 moving together with the train 2 can be specified with a relatively correct accuracy according to the schedule of the train 2, and as illustrated in the present embodiment, the base station area 4 narrower than the general registration area 5 can be used for the terminal presence area of the portable communication terminal 6 moving together with the train 2. This means that the transmission of the incoming call request to a given portable communication terminal 6 can be limited to only the base station forming the base station area 4 in which the portable communication terminal 6 is present. As described above, the present embodiment has also an advantage that the procedure efficiency of the incoming call request can be improved compared with the conventional technology.

C: Modifications

As described above on an embodiment of the present invention, the above embodiment is just an example, and can be modified diversely within the scope of the present invention. Modifications include the following:

(1) In the above embodiment, an example is given in which the terminal presence area of the portable communication terminal 6 in the train 2 is successively changed according to the scheduled pass area of the train 2. However, the modification thereof may be made as follows: When the control unit 112 of the control station 11 receives the location registration request including the terminal identification number of the portable communication terminal 6 moving with the train 2 and the identification number of the train 2, the identification number of the train 2 is stored as the information on the terminal presence area of the portable communication terminal 6 in the terminal location table. When the incoming call request to a portable communication terminal 6 in the train 2 is received, the control unit 112 reads out the identification number of the train 2 stored for the information on the terminal presence area of the portable communication terminal 6. In addition, the control unit 112 specifies the scheduled base station area 4 in which the train 2 is present at this time based on the scheduled pass time information and the scheduled pass area information for the identification number of the train 2 in the train location table. The control unit 112 thus transmits the previously received incoming call request to the base station 13 forming the thus-specified base station area 4. If the terminal presence area of the portable communication terminal 6 is specified based on the train location table only when the incoming call request to a portable communication terminal 6 in the train 2 is received, the terminal presence area need not be changed as necessary with the elapse of time by the control unit 112, and the location registration of the portable communication terminal 6 in the train 2 can be processed more easily.

When the configuration of this modification is employed, and if the notice of abnormal running from the base station 13 is received as the schedule of the train 2 is disrupted, the control unit 112 specifies the scheduled general registration area 5 in which the train 2 is present at this time based on the scheduled pass time information and the auxiliary pass area information corresponding to the identification number of the train 2 in the train location table. The control unit 112 transmits the incoming call request to a plurality of base stations 13 in the thus-specified general registration area 5.

(2) In the above embodiment, an example is given in which the train location table is prepared in advance according to the schedule of the train. However, the scheduled pass time information and the scheduled pass area information in this train location table may be changed as necessary according to the running condition, etc. of the train. For example, a running management center which monitors and manages the running condition of the train is connected to the mobile communication network 1, and if the actual running condition is deviated from the schedule, the subsequent running schedule (different from a predetermined schedule) based on the actual running condition is notified to the control station 11 from the running management center. For example, when the train 2 is behind schedule, a new running schedule with the delay reflected therein will be notified to the control station 11. When such a notice is received, the control unit 112 of the control station 11 updates the contents of the train location table based on the newly notified running schedule. As a result, the running condition of the train 2 can be reflected in the contents of the train location table on a real time basis, and the terminal presence area can be registered with higher accuracy.

(3) When the schedule of a train is disrupted, schedules of other trains moving on the same track can be disrupted in a chain reaction manner. Thus, when the schedule of the relay unit 21 installed in a train 2 is disrupted, not only the terminal presence area of the portable communication terminal 6 in the train 2 is switched to the auxiliary presence area, but also the terminal presence areas of the portable communication terminals 6 accommodated in other trains 2 moving on the same track as the train 2 may be switched to the auxiliary presence area. However, in this case, the identification numbers of a plurality of trains moving on the same track have to be related to each other, and if the schedule of either train is disrupted, it is necessary to enable to specify the other trains moving on the same track.

When a train moves earlier than the schedule time, the running condition of the train can be returned to the normal running on the schedule by temporarily making a stop or reducing the speed. In such a case, it is sufficient that only the terminal presence area in the train with the schedule disrupted can be switched to the auxiliary presence area, and it is unnecessary for the portable communication terminal 6 in other trains on the same track that the terminal presence area is switched to the auxiliary presence area.

(4) In the above embodiment, the scheduled base station area 4 in which the train 2 is present is used for the terminal presence area, but the scheduled base station area 4 in which the relay unit 21 is present may be used. In this case, in the train location table shown in FIG. 7, the scheduled pass area information is changed to the information indicating the scheduled base station area 4 in which the relay unit 21 is present as the train 2 moves, and the scheduled pass time information is changed to the information indicating the scheduled pass time in which the relay unit 21 is present in each base station area 4.

In the above embodiment, an example is given in which one relay unit 21 is installed in each train 2, but the installation of the relay unit 21 is not limited thereto, and for example, the relay unit 21 may be installed in each car of the train 2. In this case, in the train location table, the identification number allotted to the relay unit 21, the scheduled pass area information indicating the scheduled base station area 4 in which the relay unit 21 is present, and the scheduled pass time in which the relay unit 21 is present in each base station area 4 are linked to each other for each relay unit.

(5) In the above embodiment, an example is given in which a base station area is used for a scheduled pass area in which a train 2 is scheduled to pass, but the area (the pass area) used for the scheduled pass area is not limited to the base station area. For example, an area including at least two base station areas may be used for a scheduled pass area.

(6) The "moving object" of the present invention is not limited to the train illustrated in the above embodiment, but means a concept including various kinds of movable objects such as a bus. In short, it is a movable object which is accompanied by a portable communication terminal with a moving path and a moving time thereof predetermined or predictable.

What is claimed is:

1. A location registration apparatus comprising:
 a presence area storage unit for storing a presence area information indicating a presence area of a portable communication terminal;
 a traveling schedule storage unit for storing a scheduled path information indicating a scheduled path of a moving object and a scheduled time information indicating a scheduled time of the movement of the moving object; and a control unit for, when the portable communication terminal is moving with the moving object, changing the presence area information of the portable communication terminal stored in the presence area storage unit based on the current time, the scheduled path information, and the scheduled time information stored in the traveling schedule storage unit, wherein the control unit receives, from a moving object communication apparatus installed in the moving object, an identification information of a portable communication terminal moving with the moving object, and specifies the portable communication terminal moving with the moving object based on the identification information, wherein the scheduled path information indicates one or more pass areas through which the moving object passes, and the scheduled time information indicates the time for which the moving object is located in each of the pass areas, wherein, while the portable communication terminal is moving with the moving object, the control unit specifies the pass area within which the portable communication terminal is to be located based on the current time, the scheduled path information, and the scheduled time information, and changes the presence area information of the portable communication terminal to the one corresponding to the specified pass area, wherein the pass area is a base station area each formed by a base station, wherein the traveling schedule storage unit stores an auxiliary path information indicating a more extensive area than the pass area indicated by the scheduled path information; and wherein, when the moving object is not moving on schedule, the control unit changes the presence area information on the portable communication terminal moving with the moving object to a presence area information according to the location of the moving object based on the auxiliary path information and the scheduled time information.

2. A location registration apparatus according to claim 1, wherein the control unit recognizes that the moving object does not move on schedule by receiving, from a base station forming a base station area through which the moving object passes, a notice of abnormal running that indicates that the moving object does not pass the base station area on the schedule indicated on the scheduled time information.

3. A location registration apparatus comprising:

a traveling schedule storage unit for storing a scheduled path information indicating a scheduled path of a moving object and a scheduled time information indicating a scheduled time of the movement of the moving object; and a control unit for, when the portable communication terminal is moving with the moving object, specifying a location of the moving object based on the current time, the scheduled path information and the scheduled time information in the traveling schedule storage unit, and specifying a presence area of the portable communication terminal based on the location of the moving object, wherein the control unit receives, from a moving object communication apparatus installed in the moving object, an identification information of a portable communication terminal moving with the moving object, and specifies the portable communication terminal moving with the moving object based on the identification information, wherein the scheduled path information indicates one or more pass areas through which the moving object passes, and the scheduled time information indicates the time for which the moving object is located in each of the pass areas, and wherein, when the portable communication terminal is moving with the moving object, the control unit specifies the pass area within which the portable communication terminal is to be located based on the current time, the scheduled path information, and the scheduled time information, and specifies the presence area information of the portable communication terminal to the one corresponding to the specified pass area, wherein the pass area is a base station area each formed by a base station, wherein the traveling schedule storage unit stores an auxiliary path information indicating a more extensive area than the pass area indicated by the scheduled path information; and wherein, when the moving object is not moving on schedule, the control unit specifies the presence area information on the portable communication terminal moving with the moving object according to the location of the moving object based on the auxiliary path information and the scheduled time information.

4. A location registration apparatus according to claim 3, wherein the control unit recognizes that the moving object does not move on schedule by receiving, from a base station forming a base station area through which the moving object passes, a notice of abnormal running that indicates that the moving object does not pass through the base station area on the schedule indicated on the scheduled time information.

5. A mobile communication network comprising:

a plurality of base stations each of which forms a base station area;

a presence area storage unit for storing a presence area information indicating a presence area of a portable communication terminal;

a traveling schedule storage unit for storing a scheduled path information indicating one or more base station areas through which a moving object accompanied by one or more said portable communication terminals passes, and a scheduled time information indicating a scheduled time of the movement of the moving object; and a control station which, when the portable communication terminal is moving with the moving object, specifies a present area information indicating a base station area within which the moving object is predicted to be located based on the current time, the scheduled path information, and the scheduled time information stored in the traveling schedule storage unit, changes the presence area information of the portable communication terminal stored in the presence area storage unit based on the specified presence area information, retrieves the presence area information of the portable communication terminal from the presence area storage unit when an incoming call request to the portable communication terminal is received, and transmits the incoming call request to the base station in the presence area indicated by the retrieved presence area information, wherein the traveling schedule storage unit stores an auxiliary path information indicating a more extensive area than the base station area; and wherein, when the moving object is not moving on schedule, the control station specifies the area within which the moving object is located based on the current time, the auxiliary path information, and the scheduled time information, and, based on this information indicating the area, changes the presence area information of the portable communication terminal moving with the moving object.

6. A mobile communication network comprising:

a plurality of base stations each of which forms a base station area;

a presence area storage unit which stores a presence area information indicating presence areas of a plurality of portable communication terminals, and stores an identification information of a moving object for the portable communication terminal moving with the moving object;

a traveling schedule storage unit for storing a scheduled path information indicating one or more base station areas through which the moving object passes, and a scheduled time information indicating the scheduled time of the movement of the moving object; and a control station that, when receiving an incoming call request to a portable communication terminal moving with the moving object, specifies the presence area of the portable communication terminal based on the current time, the scheduled path information, and the scheduled time information of the moving object with the identification information, and transmits the incoming call request to the base station in the specified presence area.

wherein the traveling schedule storage unit stores an auxiliary path information indicating a more extensive area than the base station area, and wherein the control station specifies the presence area of a portable communication terminal moving with the moving object based on the current time, the auxiliary path information and the scheduled time information for the identification information when the moving object is not moving on schedule.

7. A mobile communication network according to claim 5 or 6:

wherein the base station comprises a storage unit for storing a scheduled presence time information indicating the time for which the moving object is to be within a base station area of the base station; and a base station control unit for judging if the moving object is moving on schedule based on the scheduled presence time information, and sending, when judged that the moving object is not moving on schedule, a notice of abnormal running indicating that to the control station, and wherein the control station recognizes, by receiving the notice of abnormal running from the base station, that the moving object does not move on schedule.

8. A mobile communication network according to claim 7, wherein the base station control unit compares the time at which a notice of the location is received from a moving object communication unit installed on the moving object with the time indicated by the presence scheduled time information, and determines, based on the result of comparison, whether or not the moving object moves on schedule.

* * * * *

UNITED STATES PATENT AND TRADEMARK OFFICE
CERTIFICATE OF CORRECTION

PATENT NO. : 7,164,911 B2 Page 1 of 1
APPLICATION NO. : 10/045675
DATED : January 16, 2007
INVENTOR(S) : Yugo Watanabe It is certified that error appears in the above-identified patent and that said Letters Patent is hereby corrected as shown below:

Column 18, in claim 7, line 1, after "network according to" delete "claim" and substitute --claims-- in its place.

Signed and Sealed this

First Day of May, 2007

JON W. DUDAS
*Director of the United States Patent and Trademark Office*